United States Patent [19]

Bellows

[11] 4,117,079

[45] Sep. 26, 1978

[54] REMOVAL OF A GAS COMPONENT PRESENT IN A GASEOUS STREAM

[75] Inventor: Richard James Bellows, Linden, N.J.

[73] Assignee: Exxon Research & Engineering Co., Linden, N.J.

[21] Appl. No.: 802,660

[22] Filed: Jun. 2, 1977

[30] Foreign Application Priority Data

Jun. 11, 1976 [GB] United Kingdom ............... 24299/76

[51] Int. Cl.² ............................................. B01D 53/34
[52] U.S. Cl. .................................... 423/223; 423/210;
423/220; 423/229; 423/232; 55/16; 55/158
[58] Field of Search ............... 423/210, 220, 228, 223,
423/232; 55/16, 158

[56] References Cited

U.S. PATENT DOCUMENTS

| | | | |
|---|---|---|---|
| 3,396,510 | 8/1968 | Ward et al. | 55/158 X |
| 3,676,220 | 7/1972 | Ward | 55/158 |
| 3,851,041 | 11/1974 | Eickmeyer | 423/223 |
| 3,911,080 | 10/1975 | Mehl et al. | 423/210 |

Primary Examiner—Earl C. Thomas
Attorney, Agent, or Firm—Kenneth P. Glynn

[57] ABSTRACT

A membrane suitable for absorbing a gas component present in a gaseous stream (e.g. carbon dioxide with a hydrogen feed for an alkaline fuel cell) comprises a porous layer of hydrophilic material, both faces of which are covered by a layer of a mixture of 10 to 90 wt.% of a hydrophobic substance and 90 to 10 wt.% of a hydrophilic substance, the hydrophilic portions of the three layers being impregnated with a carbon dioxide hydration catalyst e.g. sodium meta arsenite, at a concentration of 0.1 to 3M and a 2 to 14N alkali metal buffer solution.

The gaseous component is absorbed from a gaseous stream containing said component by causing said stream to flow adjacent to a humidified stripping gas having a relative humidity of 0.4 to 0.95, the flows of said stream and said stripping gas being separated by the membrane.

25 Claims, 1 Drawing Figure

U.S. Patent  Sept. 26, 1978  4,117,079
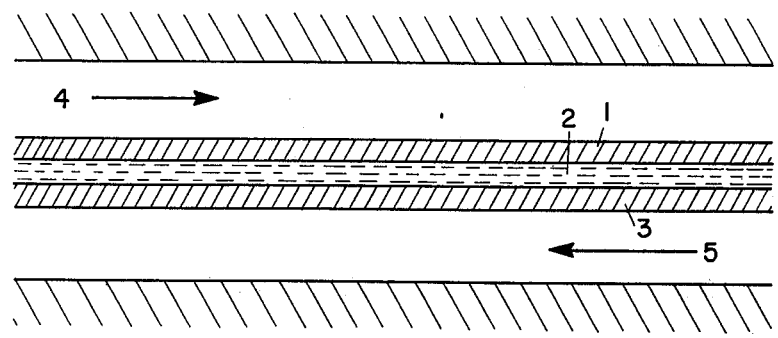

REMOVAL OF A GAS COMPONENT PRESENT IN A GASEOUS STREAM

This invention relates to the removal of gases, especially of carbon dioxide, from process streams.

The hydrogen feed for alkaline fuel cells will often become contaminated with carbon dioxide and this must be removed to sustain cell operation. It is known that the problem posed by the carbonization of the basic electrolyte of a fuel cell is one of the most serious problems so far encountered in fuel cell technology.

For fuel cells having industrial uses, i.e. consuming oxygen from the air and directly or indirectly a carbonaceous fuel, a certain amount of carbonic acid enters the cell from various sources. Thus, air itself contains a small amount of $CO_2$; the direct use of a carbonaceous fuel yields some carbonic acid as a reaction by-product and the reforming of a carbonaceous fuel produced from hydrogen contains a fair proportion of $CO_2$.

This is no problem if an acid medium is used but in this case the choice of material for the electrode is restricted. Thus it has been found that only the platinoids are suitable and this means that cells using an acid medium are expensive.

Using a basic medium as electrolyte however enables one to use numerous inexpensive and readily available materials as electrodes. However, the carbonic acid which is produced rapidly carbonizes the basic electrolyte and eventually transforms the electrolyte entirely into an acid solution of carbonate which in most cells leads to a breakdown in performance.

It is therefore desirable to provide a fuel cell which allows continuous or intermittent decarbonization of the electrolyte. Various methods of removing carbon dioxide from such feed streams have been proposed in the past e.g. in U.S. Pat. No. 3,527,618 and in W. J. Ward "Immobilised Liquid Membrane for Continuous Carbon Dioxide Removal" Aerospace Medical Research Laboratories, Wright Patterson Air Force Base, Ohio AMRL-TR-67-53 June 1967.

We have now devised a process and apparatus which are simple, compact and cheap. According to this invention a membrane suitable for absorbing a gaseous component, especially carbon dioxide, present in gaseous streams comprises a porous layer of hydrophilic material, both faces of which being covered by a layer of a mixture of 10 to 90 wt% of hydrophobic and 90 to 10 wt.% of hydrophilic substances, the hydrophilic portions of the three layers being impregnated with a carbon dioxide hydration catalyst at a concentration of 0.1 to 3M and a 2 to 14N alkali metal buffer solution. In the process according to this invention a gaseous component (e.g. carbon dioxide) is absorbed from a gaseous stream containing said component wherein said stream is caused to flow adjacent to a humidified stripping gas having a relative humidity of 0.4 to 0.95, the flows of said stream and said stripping gas being separated by the membrane of this invention.

The hydrophilic layer, which is the central layer can be made of any hydrophilic material. Usually it is a porous fibrous material, for example paper, asbestos, or plastics such as polyvinyl chloride or foamed polystyrene, surface treated to make them hydrophilic. The thickness of this layer can vary but a suitable thickness is 10 to 500 μm (micrometres) e.g. 50 to 200, for instance 50 to 100 μm.

The outer two layers are partially hydrophobic since they are mixtures of hydrophobic and hydrophilic substances. These layers enhance and extend the gas liquid interface. As the hydrophobic substance one may use poly tetrafluoroethylene, dichloro difluoro ethylene, ethylene-propylene, ethylene-butylene or the halogenated copolymers of ethylene-propylene, ethylene-butylene, propylene-butylene and isopropyl-butylene.

As the hydrophilic substance one may use carbon black, asbestos or cellulose materials such as paper, wood fibre or straw fibre. The amount of hydrophilic substance in the mixture may be for example from 10 to 90 wt.% such as from 70 to 90 wt.% e.g. about 80 wt.% Especially suitable is a mixture of polytetrafluoroethylene and carbon black.

The thickness of each of these two outer layers can be 10 to 500 μm. usually 25 to 200 μm. e.g. 25 to 150 μm, e.g. about 50 μm.

All three layers are arranged so that they are contiguous to one another. This is conveniently achieved by coating techniques such as spraying, silkscreen technique (serigraphy), filtration or painting. The hydrophilic portions of all three layers which form the membrane are impregnated with a 0.1 to 3M solution of carbon dioxide hydration catalyst and an alkali metal buffer solution. By "carbon dioxide hydration catalyst" we mean a catalyst which promotes the conversion of carbon dioxide to bicarbonate ions and the decomposition of bicarbonate to gaseous carbon dioxide.

Suitable examples of such catalysts are meta arsenites, such as $NaAsO_2$, $KAsO_2$, $Li AsO_2$ and the corresponding antimonites and bismuthites. One may alternatively use the corresponding oxides, e.g. arsenious oxide. Also one may use potassium and sodium selenites, tellurites or metaborates or selenious acid. Another suitable catalyst is an approximately equimolar mixture of boric acid and diethanolamine, e.g. 1M boric acid and 1M diethanolamine. Each of boric acid and diethanolamine could be used in a concentration of from 0.2M to saturation provided the concentration of each is approximately the same.

In order to enhance the permeability of the membrane to the gaseous component, e.g. carbon dioxide, by the mechanism of facilitated transport, the catalyst is dissolved in a 2N to 14N alkali metal buffer solution which may be any water soluble alkali metal bicarbonate - alkali metal carbonate mixture, e.g. $KHCO_3/K_2CO_3$ or $CsHCO_3/Cs_2CO_3$. Conveniently, one can mix a 1N solution of the catalyst with a 2N to 14N buffer solution, for example one can use a buffered catalyst solution $5NK^+$, $1NAsO_2-$ $4N(CO_3^{--}+HCO_3^{-})$, or $8NCs^+$, $8N(CO_3^{--}+HCO_3^{-})$, 1M boric acid, 1M diethanolamine. The impregnation should be continued until the hydrophilic portions of the three layers are saturated with catalyst and buffer solution.

Also if desired the catalyst and alkali metal buffer solution can be mixed with potassium or caesium fluorides, for operation at lower relative humidities.

It is preferred that the ratio of the molar concentration (M) of KF of CsF to alkali metal e.g. K, in the buffer solution be from 4:1 to 1:2.

If desired the membrane may be strengthened by the insertion of strengthening layers within and/or between the central hydrophilic layer and the outer partially hydrophobic layers.

In order to carry out the process of this invention the membrane is placed between two streams one stream is the gaseous stream containing the gaseous component which it is desired to absorb and the other is a humidified stripping gas with a relative humidity of 0.4 to 0.95. Although the gaseous component is preferably carbon dioxide it can be another gas, e.g. hydrogen sulphide, nitric oxide, oxygen or carbon monoxide, provided the following conditions exist:

1. There is a stripping gas with a lower concentration of said gaseous component, e.g. humidified air or humidified nitrogen.
2. The relative humidity of the stripping gas can be controlled to 0.4 to 0.95, preferably about 0.75.
3. There is a partial pressure, e.g. 1/10mm Hg up to 300mm Hg of said gaseous component as the driving force between the gaseous stream and the stripping gas.
4. Transport of said gaseous component across the membrane is accomplished by a carrier i.e. the process of facilitated transport.
5. The primary mass transfer resistance is the rate of interconversion of said gaseous component (very near the gas-liquid interface) between a physically dissolved species and the facilitated transport carrier species.

Examples of humidified stripping gas are humidified nitrogen, humidified air or other humidified inert low $CO_2$ gas. Thus, hydrogen feed for an alkaline fuel cell may be stripped of a very high proportion of its carbon dioxide before being used as the feed for the fuel cell. Alternatively, the process of this invention may be used for substantially removing carbon dioxide from feeds for refinery or chemical industry use, e.g. reformer gas, shift gas or syngas ($H_2$,CO). Thus, it should be possible to remove 90-99% of the carbon dioxide from reformer gas and at the same time cut auxiliary power loss in an electro chemical decarbonator by at least 20 times. Cutting auxiliary power loss is important because there is a very great incentive for low cost - high efficiency decarbonation for alkaline fuel cells where the extra voltage of alkaline electrolyte seems counter balanced by the energy requirements of decarbonation.

The flow of the gaseous stream (e.g. stream containing carbon dioxide) and the stream containing humidified stripping gas are usually countercurrent, but if desired they could be co-current or even cross-current. For fuel cell applications the flow rate of the stripping gas will be 2-5 times, e.g. about 4 times, that of the gaseous stream, for example $CO_2$-containing gas, e.g. reformer gas.

One can use a stack of membranes. Thus, one can use 10 membranes each spaced from each other (e.g. by about 500 microns). With such a stack of 10 membranes one could use 11 gas streams, for example 6 nitrogen in alternate countercurrent flow with 5 hydrogen and carbon dioxide streams, so that each stream (apart from two outside nitrogen streams) flows between two membranes.

The membrane of this invention had advantages over activated hot potassium carbonate $CO_2$ removal processes by eliminating the need for high temperature stream stripping.

An example of a membrane of this invention is described with reference to the drawing:

Referring to the drawing the membrane comprises outer layers 1 and 3 which are partially hydrophobic and are mixtures of polytetrafluoroethylene and carbon black and an inner layer 2 which is porous paper, 75 μm thick. This porous paper layer 2 has been impregnated with a $KHCO_3/K_2CO_3$ buffered solution of caesium arsenite 5NCs+, 1NAsO$_2^-$, 4N (CO$_3^{--}$, HCO$_3^-$). The outer layers which are 100 μm thick have been sprayed on using a mixture of 20 wt.% polytetrafluoroethylene and 80 wt.% carbon black. (5 wt.% Vulcan XC-72, 92 wt.% Pittsburg RB).

The drawing shows a carbon dioxide contaminated stream 4 flowing in counter-direction to humidified air as stripping gas 5, this stripper gas removing most of the carbon dioxide from the stream 4.

EXAMPLE 1

A membrane having a total area of 1 dm$^2$ was prepared in a similar manner to that described above with reference to the drawing. The central hydrophilic layer was 75 μm thick. The outer partially hydrophobic layers, 100 μm thick were sprayed on using a mixture of 20 wt.% polytetrafluoroethylene (Teflon), 8 wt.% carbon black (Vulcan XC-72) and 72 wt.% carbon black (Pittsburgh RB).

The central hydrophilic layer consisted of regenerated cellulose paper made by Perang which is alkali resistant. This had been impregnated with an 8N $Cs_2CO_3/CsHCO_3$ buffered solution of 1M boric acid and 1M diethanolamine.

This membrane was used in two runs to absorb carbon dioxide from two reformer gases, one having a relatively high content of $CO_2$ and the other a lower content of $CO_2$. In both runs the temperature was 75° C, the relative humidity 0.75 and the stripper gas which was used was nitrogen. It can be seen from the following data that a large amount of the $CO_2$ was removed in each run.

|  | High $CO_2$ Feed | Low $CO_2$ Feed |
| --- | --- | --- |
| Feed reformer gas composition | 23.6 mole % $CO_2$ in $H_2$ | 10.1 mole % $CO_2$ in $H_2$ |
| Outlet reformer gas composition | 4.9–12 mole % $CO_2$ in $H_2$ | 0.4–3.5 mole % $CO_2$ in $H_2$ |
| Feed reformer gas flow rate | 70–90 cm$^3$/min (STP dry) | Same |
| Stripper gas flow rate | $N_2$ ~ 240–252 cm$^3$/min (STP dry) | Same |

EXAMPLE 2

In this Example a stack of 10 membranes identical to that of Example 1 were used, the total membrane area being 17.5 dm$^2$.

This membrane was used to absorb carbon dioxide from reformer gas, the temperature being 65° C, the relative humidity 0.75 and the stripper gas being air. The reformer gas and stripper gas flowed in alternate countercurrent flow between the membranes. From the following data it can be seen that there is an efficient removal of $CO_2$

| | |
| --- | --- |
| Feed reformer gas composition | 23.6 mole % $CO_2$ in $H_2$ |
| Outlet reformer gas composition | 0.56–1.0 mole % $CO_2$ in $H_2$ |
| Feed reformer gas flow rate | 440 cm$^3$/min (STP, dry) |
| Stripper gas flow rate | 1680 cm$^3$/min (STP, dry) |

Comparative Example

In this Example a flat cellulose acetate membrane of area 10 cm$^2$ and thickness 200 μm was used. This was impregnated with a 6.3N$Cs_2CO_3$/CsHCO$_3$ buffered solution of 1M NaAsO$_3$. The temperature was 25° C, the relative humidity was about 75% and the stripper gas was nitrogen.

From the following data it can be seen that the removal of $CO_2$ is not very efficient.

| | |
|---|---|
| Feed reformer gas composition | 23.6 mole % $CO_2$ in $H_2$ |
| Outlet reformer gas composition | 21.8 mole % $CO_2$ in $H_2$ |
| Feed reformer gas flow rate | about 80 cm$^2$/min (STP, dry) |
| Stripper gas flow rate | about 245 cm$^3$/min (STP, dry) |

Also it can be pointed out that this membrane had a permeability constant of about $$700 \times 10^{-9} \frac{cm^3(STP)cm \text{ thickness}}{sec^2 cm \text{ Hg}}$$

compared with membranes of this invention which have a permeability constant of about $$30,000 \times 10^{-9} \frac{cm^3(STP)cm \text{ thickness}}{sec^2 cm \text{ Hg.}}$$

What is claimed is:

1. A membrane suitable for absorbing a gas component present in a gaseous stream, which comprises: a porous layer of hydrophilic material, both faces of which are covered by a layer of a mixture of 10 to 90% by weight of a hydrophobic substance and 90 to 10% by weight of a hydrophilic substance, the hydrophilic portions of the three layers being impregnated with a catalyst which permits the conversion of carbon dioxide to bicarbonate ions and the decomposition of bicarbonate to gaseous carbon dioxide, and with an alkali metal buffer solution of 12 to 14N, said catalyst being selected from the group consisting of meta arsenites, antimonites and bismuthites, arsenious oxide, antimony oxide and bismuth oxide, potassium selenite, tellurite and metaborate, sodium selenite, tellurite and metaborate, selenious acid and a mixture of boric acid and diethanolamine, the concentration of said catalyst being 0.1 to 3M.

2. A membrane according to claim 1 wherein the layer which is a mixture of hydrophobic and hydrophilic substances is a mixture of polytetrafluoroethylene and carbon black.

3. A membrane according to claim 2 wherein the porous layer of hydrophilic material is a porous fibrous material.

4. A membrane according to claim 2 wherein the porous layer of hydrophilic material is 50 to 200 μm thick.

5. A membrane according to claim 1 wherein the amount of hydrophilic substance in the mixture of hydrophilic and hydrophobic substances is 70-90 wt.%.

6. A membrane according to claim 2 wherein the thickness of each outer layer is 25 to 200μm.

7. A membrane according to claim 1 wherein the buffer solution is $KHCO_3/K_2CO_3$ or $CsHCO_3/Cs_2CO_3$.

8. A membrane according to claim 2 wherein the catalyst and alkali metal buffer solution are mixed with potassium or caesium fluorides.

9. A membrane according to claim 8 wherein the ratio of the molar concentration of KF to CsF to alkali metal in the buffer solution is from 4:1 to 1:2.

10. A membrane according to claim 1 wherein the catalyst is a meta arsenite.

11. A membrane according to claim 1 wherein the catalyst is a mixture of boric acid and diethanoamine.

12. A process for absorbing carbon dioxide from a gaseous stream containing it utilizing a catalyst which permits the conversion of carbon dioxide to bicarbonate ions and the decomposition of bicarbonate to gaseous carbon dioxide, which comprises:
causing said gaseous stream to flow adjacent to a humidified stripping gas having a relative humidity of 0.45 to 0.95, the flows of said gaseous stream and said stripping gas being separated by a membrane comprising a porous layer of hydrophilic material, both faces of which are covered by a layer of a mixture of 10 to 90% by weight of a hydrophobic substance and 90 to 10% by weight of a hydrophilic substance, the hydrophilic portions of the three layers being impregnated with a catalyst which permits the conversion of carbon dioxide to bicarbonate ions and the decomposition of bicarbonate to gaseous carbon dioxide, and with an alkali metal buffer solution of 2 to 14N, said catalyst being selected from the group consisting of meta arsenites, antimonites and bismuthites, arsenious oxide, antimony oxide and bismuth oxide, potassium selenite, tellurite and metaborate, sodium selenite, tellurite and metaborate, selenious acid and a mixture of boric acid and diethanolamine, the concentration of said catalyst being 0.1 to 3M.

13. A process according to claim 12 wherein the stripping gas is nitrogen or air.

14. A process according to claim 12 wherein the flow rate of stripping gas is 2 to 5 times that of the gaseous stream.

15. A process according to claim 12 wherein the gaseous stream is reformer gas.

16. A process according to claim 12 wherein the layer which is a mixture of hydrophobic and hydrophilic substances is a mixture of polytetrafluoroethylene and carbon black.

17. A process according to claim 16 wherein the porous layer of hydrophilic material is a porous fibrous material.

18. A process according to claim 16 wherein the porous layer of hydrophilic material is 5 to 200 μm thick.

19. A process according to claim 12 wherein the amount of hydrophilic substance in the mixture of hydrophilic and hydrophobic substances is 70-90 wt.%.

20. A process according to claim 16 wherein the thickness of each outer layer is 25 to 200 μm.

21. A process according to claim 12 wherein the buffer solution is $KHCO_3/K_2CO_3$ or $CsHCO_3/Cs_2CO_3$.

22. A process according to claim 16 wherein the catalyst and alkali metal buffer solution are mixed with potassium or caesium fluorides.

23. A process according to claim 22 wherein the ratio of the molar concentration of KF or CsF to alkali metal in the buffer solution is from 4:1 to 1:2.

24. A process according to claim 12 wherein the catalyst is a meta arsenite.

25. A process according to claim 12 wherein the catalyst is a mixture of boric acid and diethanolamine.

* * * * *